(12) United States Patent
Jagerbrand et al.

(10) Patent No.: US 7,412,508 B2
(45) Date of Patent: Aug. 12, 2008

(54) DEVICE FOR INDICATING DOWNLOADING OF DATA ITEMS

(75) Inventors: Leif Jagerbrand, Gothenburg (SE); Fredrik Strauss, Kullavik (SE)

(73) Assignee: Admeta AB, Geteborg (SE)

(*) Notice: Subject to any disclaimer, the term of this patent is extended or adjusted under 35 U.S.C. 154(b) by 25 days.

(21) Appl. No.: 10/569,467

(22) PCT Filed: Aug. 26, 2003

(86) PCT No.: PCT/SE03/01310
§ 371 (c)(1),
(2), (4) Date: Oct. 12, 2006

(87) PCT Pub. No.: WO2004/025511
PCT Pub. Date: Mar. 25, 2004

(65) Prior Publication Data
US 2007/0198206 A1   Aug. 23, 2007

(30) Foreign Application Priority Data
Sep. 12, 2002  (SE) .................................. 0202718

(51) Int. Cl.
*G06F 15/16* (2006.01)

(52) U.S. Cl. ............... 709/224; 709/216; 709/217; 709/218; 709/203; 709/220; 709/224; 702/128; 710/34

(58) Field of Classification Search ................ 709/203, 709/216, 217, 218, 220, 224
See application file for complete search history.

(56) References Cited

U.S. PATENT DOCUMENTS

| | | | |
|---|---|---|---|
| 5,935,207 A | | 8/1999 | Logue |
| 6,006,332 A * | | 12/1999 | Rabne et al. .................... 726/6 |
| 6,026,444 A * | | 2/2000 | Quattromani et al. ........ 709/232 |
| 6,070,194 A * | | 5/2000 | Yu et al. ....................... 709/229 |
| 7,117,250 B1 * | | 10/2006 | Wu ............................. 709/217 |
| 7,308,487 B1 * | | 12/2007 | Dansie et al. ................ 709/219 |
| 2002/0032728 A1 * | | 3/2002 | Sako et al. ................... 709/203 |
| 2002/0107935 A1 | | 8/2002 | Lowery |
| 2002/0107973 A1 | | 8/2002 | Lennon et al. |
| 2003/0018751 A1 * | | 1/2003 | Lee et al. ..................... 709/219 |

FOREIGN PATENT DOCUMENTS

| EP | 0959419 A2 | 11/1999 |
|---|---|---|
| WO | WO 01/58131 A2 | 8/2001 |

OTHER PUBLICATIONS

Leibowitz et al., "Deconstructing the Kazaa network", Proceedings of the Third IEEE Workshop on Internet Applications (WIAPP'03), 1530-1354/03, 2003 IEEE.
Communication dated Feb. 11, 2008 issued in corresponding EP 03 795 517.6-22-1.

* cited by examiner

*Primary Examiner*—Saleh Najjar
*Assistant Examiner*—Marie Georges Henry
(74) *Attorney, Agent, or Firm*—Jeffrey S. Melcher; Manelli Denison & Selter, PLLC

(57) ABSTRACT

A device (1) for indicating downloading of a data item (3) by a user computer (5) from a first computer (7) using a data communication network (9) is disclosed. The device (1) comprises a processor (13) being configured for receiving an upload instruction for uploading the data item (3) from a second computer (15) to the user computer (5) via the data communication network (9). The upload instruction has been generated by a first markup language tag referring to the data item (3). The first markup language tag has been generated by a browser executable script uploaded to the user computer (5) from the first computer (7). The first markup language tag differs from a second markup language tag in a cache memory of the user computer (5) causing the user computer (5) to download from the second computer (15). The first and second markup language tags were generated by the browser executable script. The processor is also configured for indicating that the upload instruction has been received. Also disclosed is a device (1) for calculating an estimate of a number of downloadings of a data item (3) from a first computer (7) by a first group of user computers (5) which are configured for not allowing execution of a browser script and the cache memories of which comprise the data item (3).

11 Claims, 2 Drawing Sheets

DEVICE FOR INDICATING DOWNLOADING OF DATA ITEMS

TECHNICAL FIELD

Figure 1:
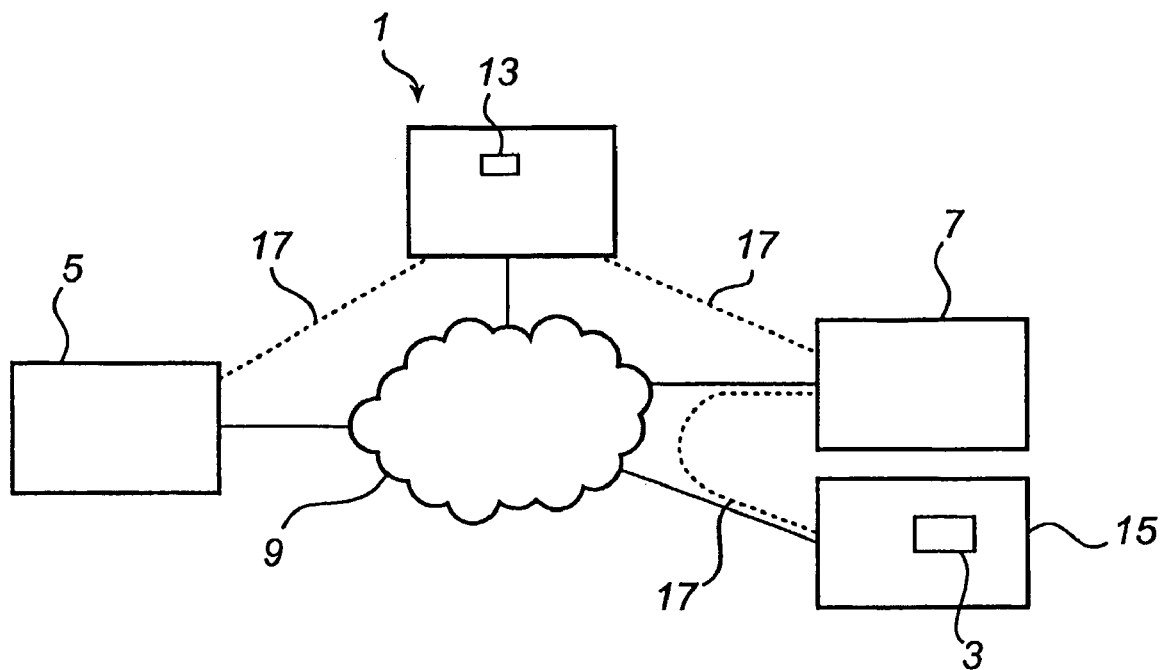

A first aspect of the present invention relates to a device for indicating downloading of a data item by a user computer from a first computer using a data communication network.

A second aspect of the present invention relates to a device for calculating an estimate of a number of downloadings of a data item by a first group of user computers which are configured for not allowing execution of a browser script and the cache memories of which comprise the data item.

BACKGROUND OF INVENTION

Knowing whether a user of a computer has downloaded a page located on a server, or a computer, is often desired. For instance downloading information, such as a page on the internet or an intranet, may be relevant for instance a webmaster interested in knowing what pages that are considered important or relevant, a web designer interested in the attractiveness of a page in terms of its design, or a market research analyst investigating the interest of one or more pages in terms of product/service attractiveness and/or page design.

Even though there are various mechanisms available for tracking computer users' behavior, by using for instance cookies, a limitation today is the limited opportunities of finding out the what a computer user in fact finds interesting, since downloading statistics of a computer user is not identical with the actual interest of a computer user. This is at least partly based on that the cashing function of a cache memory arranged in a majority of computers.

There is a number of memories that can be operated as a cache memory. In the field of data communication networks, such as the internet or an intranet, cache memories are often used to store for instance pages, or components of pages, for instance temporary files or files earlier downloaded including pages or components of pages. In these cases, it is not unlikely that the cache memory is a part of a hard disk. The cache memory can also be a specific memory, for instance in a random access memory (RAM) type of memory.

A next time a page is to be downloaded, it, or one or more of its components, may be found in the cache memory, which leads to that downloading using the data network is not considered necessary since the information to be presented by a browser is present in the cache memory. This means that obtaining information concerning downloading behavior of computer user is limited by the function of the caching mechanisms described above. Thus, in case a computer user would visit the same page a number of times it is not unlikely that the page would be downloaded only once from a server computer, and the other times the page, or components thereof, will be read from the cache memory instead of being downloaded using the data network. This leads to difficulties when interpreting downloading statistics of pages, or components thereof, since the number of downloadings, i.e. the number of times when data has been communicated using a data network, will be correct, but the number of presentations of data will not be correct.

SUMMARY OF INVENTION

An object of the present invention is to alleviate the limitation of the art. According a first aspect of the inventive concept of the present invention, a device for indicating downloading of a data item by a user computer from a first computer using a data communication network is disclosed. The device comprises a processor responsible for processing of data. The processor is configured for receiving an upload instruction for uploading the data item from a second computer to the user computer via the data communication network. The upload instruction has been generated by a first markup language tag referring to the data item. The first markup language tag has been generated by a browser executable script, which has been uploaded to the user computer from the first computer.

The first markup language tag is different from a second markup language tag in a cache memory of the user computer, where the second markup language tag having been downloaded to the user computer earlier and may be stored in the cache memory. The first and second language tags comprise the same data item. However, they were downloaded to the user computer at different times.

It should be pointed out that there is a number of memories that can be operated as a cache memory. In the field of data communication network, such as the internet or an intranet, cache memories are often used to store for instance pages, or components of pages, for instance temporary files or files earlier downloaded including pages or components of pages. The cache memory can be a specific memory, for instance in random access memory (RAM), a hard disk, or another suitable memory available on a market. The first and second markup language tags have been generated by the browser executable script. However, they were generated during different downloading processes. The processor is also configured for indicating that an upload instruction has been received.

When a computer user, using a user computer, has requested downloading of a data item, the computer searches the cache memory in order to investigate whether the data item, or a component thereof, already resides in the cache memory. Using the present invention will lead to that there will be a deviation between a page, or a component thereof, and a copy of the same page, or a component thereof, available in the cache memory. Thus the browser will not recognize the copy in the cache memory, and it will download the page, or component thereof, once again. This is because the browser executable script generates a differing markup language tag when executed. Thus, the browser is made to retrieve the data item, or component thereof, once again by using the data communication network. This leads to increased opportunities of indicating whether a data item, or component thereof, such as a page, in fact has been uploaded from the first computer to the user computer.

In a preferred embodiment, the processor is further configured for receiving an upload instruction for uploading the data item from the second computer to the user computer via the data communication network. However, the upload instruction has been generated by a supplementary markup language tag referring to the device. The supplementary markup language tag is a static markup language tag, as opposed to the markup language tag described above, which presents a dynamic feature based on its ability to generate differing markup language tags. This embodiment offers an advantage of providing an indication in the case of the user computer browser not being equipped for execution of scripts, or if it is turned off. However, since this tag is static, it will be found in the cache memory by the browser in the case of that the data item, or the component thereof, has been downloaded earlier. This leads to that downloading such a data item, or component thereof, will only lead to that the indicating that a download instruction has been received will be reduced to a single upload, unless the cache memory is cleared from its contents or the data item, or component thereof, has been purged. In such cases, the next download instruction will be registered by the device and an upload will take place. This also offers a functionality of the device as described in the table below. However, this requires that the data item, or the component thereof, has been downloaded earlier.

|  |  | Cache memory operative | |
|---|---|---|---|
|  |  | Yes | No |
| Browser able to execute scripts | Yes | F | F |
|  | No | P | F |

'F' implies full functionality of the device according to this embodiment in terms of the number of indicated downloadings being the actual number of downloadings of a data item, or component thereof. 'P' implies partial functionality in terms of the number of indicated downloadings being the same or a lower number than the actual number of downloadings of a data item, or component thereof since such a number includes both the number of finding the desired data item, or component thereof, in the cache memory and the actual number of downloadings using a data network.

In another embodiment, the first computer and the second computer is constituted by a single computer, and the data communication network is the internal communication arrangement in the computer.

In another embodiment, the second computer is constituted by the device.

In another embodiment the data item is located in the device.

In another embodiment, the data item, or a component thereof, comprises one of text, image, and sound. The data item can also be perceived as a measuring, or indicating, point. Also, it is not crucial that the data item in fact comprises information that is of relevance to the computer user. It is a mere means for providing an indication of the occurrence of a downloading.

In another embodiment, the data communication network is one of the internet and an intranet.

In another embodiment, the indicating that an upload instruction has been received is transmitted to a third computer for managing upload statistics.

In another embodiment, the processor is further configured for indicating that a upload instruction has been received by at least one of updating at least one of a database, and a log file, and indicating using at least one of a computer screen, printer, and a sound alarm.

According to a second aspect of the present invention, a device for calculating an estimate of a number of downloadings of a data item from a first computer by a first group of user computers which are configured for not allowing execution of a browser script and the cache memories of which comprise the data item. The device comprises a processor configured for calculating the estimate according to the following relation:

A*D/B, where

A is a number of downloadings from a second plurality of user computers (5) allowing execution of a browser script and in which the cache memories comprise the data item (3).

B is a number of downloadings from a third plurality of user computers (5) allowing execution of a browser script and in which the cache memories are one of absent, out of order, and do not comprise the data item (3).

D is a number of downloadings from a fourth plurality of user computers (5), not allowing execution of a browser script and in which the cache memories are one of absent, out of order, and do not comprise the data item (3).

The processor is further configured for indicating the estimate.

In a preferred embodiment, the processor is configured for calculating the estimate further including an adjustment factor multiplicatively associated with the relation. In case the adjustment factor would be denoted C, then the relation would be as follows.

Estimate=C*A*D/B, where A, B, D correspond to the variables above.

In preferred embodiments, the adjustment factor is in at least one of the intervals: 0.95 to 1.05 and 0.5 to 2.

This offers the functionality as described in the table below.

|  |  | Cache memory hit | |
|---|---|---|---|
|  |  | Yes | No |
| Browser able to execute scripts | Yes | F | F |
|  | No | Estimate | F |

'F' implies full functionality of the device in terms of the number of indicated downloadings being the actual number of downloadings of a data item, or component thereof.

BRIEF DESCRIPTIONS OF DRAWINGS

FIGS. 1 to 4 schematically show preferred embodiments of a device according to the present invention.

DESCRIPTION OF PREFERRED EMBODIMENTS

In FIG. 1, a preferred embodiment of a device 1 for indicating downloading of a data item 3 by a user computer 5 from a first computer 7 using a data communication network 9 is disclosed. The device 1 comprises, besides obvious necessary hardware components, such as communication capabilities 11, a processor 13 which is configured for receiving an upload instruction for uploading the data item 3 from a second computer 15 to the user computer 5 via the data communication network 9.

In preferred embodiments, the data item 3 comprises at least one of text, image, and sound.

The upload instruction is arranged to be generated by a first markup language tag referring to the device 1 and the first markup language tag is arranged to be generated by a browser executable script uploaded to the user computer 5 from the first computer 7. The first markup language tag differs from a second markup language tag in a cache memory of the user computer 5. The first and second markup language tags have been generated by the browser executable script. Finally, the processor 13 is also configured for indicating that the upload instruction has been received. That the first markup language tag differs from a second markup language tag can be achieved in a number of ways. The key lies in the creation of a unique identifier related to at least one of the tags. The unique identifier is one of, or in combination, a time identifier, a date identifier, an identifier arranged in a table which identifier is only read and used once, and a random identifier. In the case of a random identifier, an example of a code accomplishing the purpose of the invention is presented below.

```
<SCRIPT LANGUAGE ="JavaScript">
<!--
document.write ('<img
Src=http://web.admeta.com/public/probe.asp?id=XXXX&random
=' + Math.random( ) + ' " width="1" height ="1"
border="0">');
//-->
</SCRIPT>
```

The code above is in JavaScript and the line starting with "document" and ending with "'>');" should be interpreted as a single sentence.

Another example of code also accomplishing the desired effect is based on time data and is presented below.

```
<SCRIPT LANGUAGE="JavaScript">
<!--
var d = new Date( )
document.write('<img
src="http://web.admeta.com/public/probe.asp?id=XXX&slump='
+ d.getTime( ) + '">');
//-->
</SCRIPT>
<img src="http://web.admeta.com/public/probe.asp?id=XXX">
```

However, the language being JavaScript is not critical for the working of the present invention. Any other language considered suitable by a man skilled in the art.

The markup language is one of HTML, XML, DHTML, or any other language considered suitable by a man skilled in the art.

According to alternative embodiments, the communication between at least two of the device 1, the user computer 5, the first computer 7, and the second computer 15 is from a hardware perspective constituted by direct wires. This is indicated in FIG. 1 by the dashed lines 17.

According to another embodiment of the device 1, the processor 13 is further configured for receiving an upload instruction for uploading the data item 3 from the second computer 15 to the user computer 5 via the data communication network 9. In this embodiment, the upload instruction is configured for being generated by a supplementary markup language tag referring to the device 1. The supplementary markup language tag is a static markup language tag. An example of a static markup language tag according to the present invention is presented below. Also here, the line should be interpreted as a single sentence

```
<img
    src="http://web.admeta.com/public/probe.asp?id=XXXX"
    width="1" height="1" border="0">
```

Finally, the processor 13 is configured for indicating that the upload instruction has been received.

Figure 2:
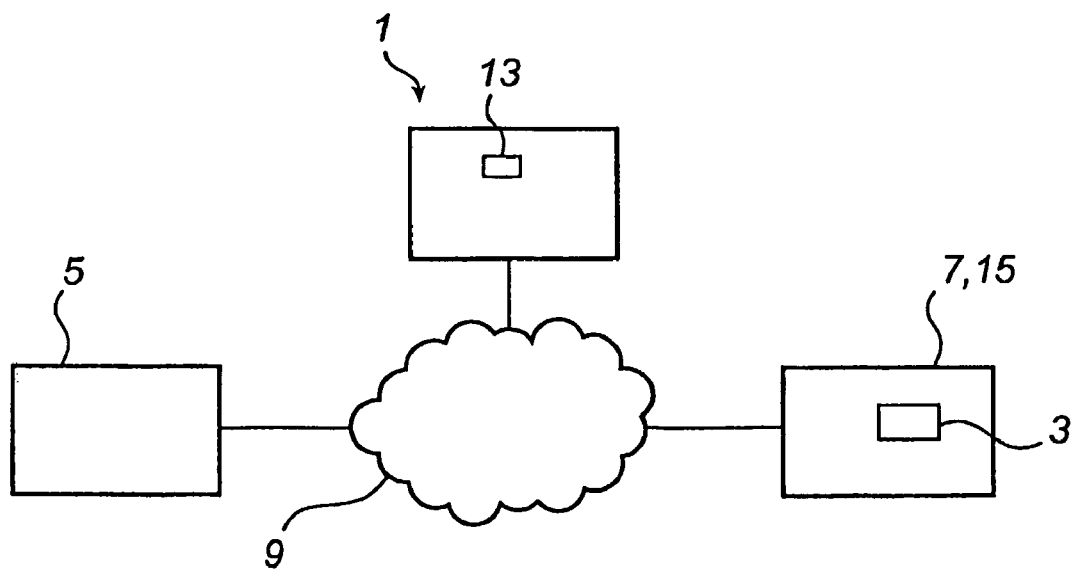

In a preferred embodiment presented in FIG. 2, the first computer 7 and the second computer 15 is constituted by a single computer, and the data communication network is the internal communication arrangement in the computer.

Figure 3:
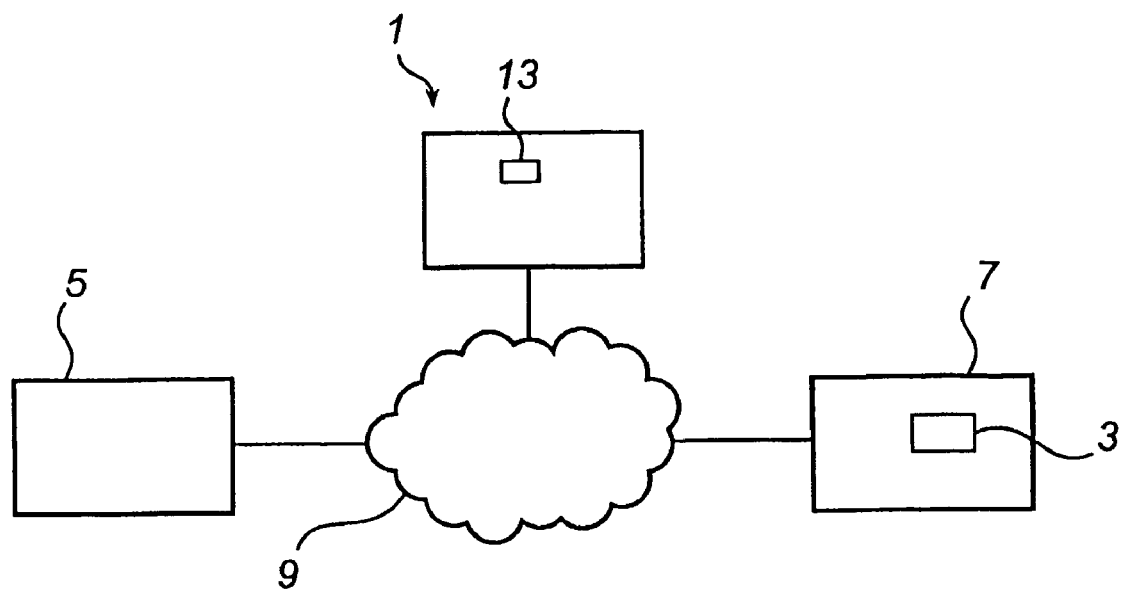

In a preferred embodiment presented in FIG. 3, the second computer 15 is constituted by the device 1.

In a preferred embodiment, the data communication network 9 is one of the internet and an intranet.

Figure 4:
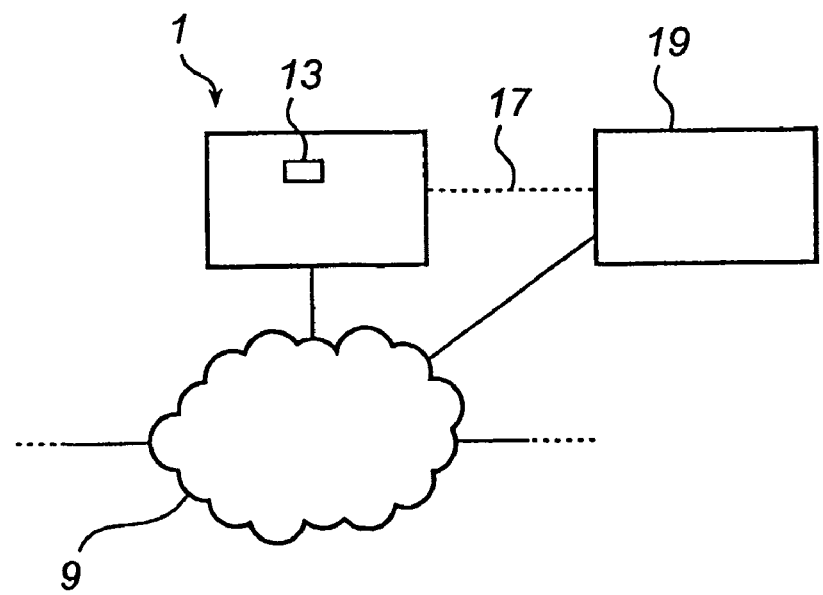

In a preferred embodiment presented in FIG. 4, the indicating that the upload instruction has been received is transmitted to a third computer 19. In FIG. 4, the third computer 19 is connected to the device 1 via at least one of the communication network 9 and a direct wire 17 indicated by a dashed line.

In a preferred embodiment, the processor 13 is further configured for indicating that the upload instruction has been received by updating at least one of a database, and a log file.

In a preferred embodiment, the processor 13 is further configured for indicating that the upload instruction has been received by indicating using at least one of a computer screen, printer, and a sound alarm.

In a preferred embodiment, a device (1) for calculating an estimate of a number of downloadings of a data item (3) from a first computer (7) by a first group of user computers (5) which are configured for not allowing execution of a browser script and the cache memories of which comprise the data item (3) is disclosed. The device (1) comprises a processor (13) configured for calculating the estimate according to the following relation:

$A*D/B$, where

A is a number of downloadings from a second plurality of user computers (5) allowing execution of a browser script and in which the cache memories comprise the data item (3). B is a number of downloadings from a third plurality of user computers (5) allowing execution of a browser script and in which the cache memories are one of absent, out of order, and do not comprise the data item (3). D is a number of downloadings from a fourth plurality of user computers (5), not allowing execution of a browser script and in which the cache memories are one of absent, out of order, and do not comprise the data item (3).

The processor is further configured for indicating the estimate.

| Up load instructions from browsers | | | |
|---|---|---|---|
| Up load instruction sequential number | Browser ID | Measuring point ID | Up load instruction type |
| 1 | 1 | 1 | HTML |
| 2 | 2 | 1 | HTML |
| 3 | 1 | 1 | JS |
| 4 | 2 | 1 | JS |
| 5 | 2 | 1 | HTML |
| 6 | 1 | 1 | JS |
| 7 | 1 | 2 | HTML |
| 8 | 1 | 1 | HTML |

In order for the numbers of upload instructions to correspond to the correct number of the number of requests may have to be adjusted. In the case where the browser allows execution of a script and when the data item has to be downloaded again, the number has to be decreased since otherwise the number of upload instructions would be too high. In the Table, a number of upload instructions are presented, together with browser identity (browser ID, measuring point identity (measuring point ID), an upload instruction type from either HTML, or JavaScript (JS). In the Table, it can be noted that up load instruction numbers 1 and 3 only present the difference that one originates from HTML and the other from JavaScript. Thus these two should only be counted once. The same reasoning applies to up load instruction numbers 2 and 4. Alternatively, a time frame may be introduced that will not reduce the number in case the time frame has been exceeded.

In a preferred embodiment the following algorithm may be used to adjust for double up load instruction requests.

1. Test if upload instruction from same browser ID and same measuring point ID and different origin
2. If yes, then count as one hit, otherwise count as two hits.

In a preferred embodiment, the following algorithm may be used to adjust for double up load instruction requests.

1. Test if upload instruction from same browser ID and same measuring point ID and different type and they are received within a time frame
2. If yes, then count as one hit, otherwise count as two hits.

This implies the following. Requests originating only from JavaScript (JS) belong to the second plurality. Requests originating from both JavaScript (JS) and HTML belong to the third plurality. Requests originating only from HTML belong to the fourth plurality.

In a preferred embodiment, the processor is configured for calculating the estimate further including an adjustment factor multiplicatively associated with the relation. In case the adjustment factor would be denoted C, then the relation would be as follows.

Estimate=C*A*D/B, where A, B, D correspond to the variables above.

In preferred embodiments, the adjustment factor is in at least one of the intervals: 0.95 to 1.05 and 0.5 to 2.

The invention claimed is:

1. Device for calculating an estimate of a number of downloadings of a data item from a first computer by a first group of user computers which are configured for not allowing execution of a browser script and the cache memories of which comprise the data item, the device comprising a processor being configured for calculating the estimate according to the following relation:

A*D/B, where

A is a number of downloadings from a second plurality of user computers allowing execution of a browser script and in which the cache memories comprise the data item, B is a number of downloadings from a third plurality of user computers allowing execution of a browser script and in which the cache memories are one of absent, out of order, and do not comprise the data item, and D is a number of downloadings from a fourth plurality of user computers, not allowing execution of a browser script and in which the cache memories are one of absent, out of order, and do not comprise the data item; and indicating the estimate.

2. Device according to claim 1, wherein the processor being configured for calculating the estimate further including an adjustment factor multiplicatively associated with the relation.

3. Device according to claim 2, wherein the adjustment factor is in at least one of the intervals: 0.95 to 1.05 and 0.5 to 2.

4. Device according to claim 1 and for indicating downloading of a data item by a user computer from a first computer using a data communication network, the device comprising a processor being configured for:

receiving an upload instruction for uploading the data item from a second computer to the user computer via the data communication network, the upload instruction having been generated by a first markup language tag referring to the data item, the first markup language tag having been generated by a browser executable script uploaded to the user computer from the first computer, the first markup language tag differing from a second markup language tag in a cache memory of the user computer, the first and second markup language tags having been generated by the browser executable script; and indicating that the upload instruction has been received.

5. Device according to claim 4, wherein the processor is further configured for receiving an upload instruction for uploading the data item from the second computer to the user computer via the data communication network, the upload instruction having been generated by a supplementary markup language tag referring to the device, the supplementary markup language tag being a static markup language tag; and indicating that the upload instruction has been received.

6. Device according to claim 4, wherein the first computer and the second computer is constituted by a single computer, and the data communication network is the internal communication arrangement in the computer.

7. Device according to claim 4, wherein the second computer is constituted by the device.

8. Device according to claim 4, wherein the data item comprises at least one of text, image, and sound.

9. Device according to claim 4, wherein the data communication network is one of the internet and an intranet.

10. Device according to claim 4, wherein the indicating that the upload instruction has been received is transmitted to a third computer.

11. Device according to claim 4, wherein the processor is further configured for indicating that the upload instruction has been received by at least one of:

updating at least one of a database, and a log file, and indicating using at least one of a computer screen, printer, and a sound alarm.

* * * * *